United States Patent [19]
Wykes

[11] Patent Number: 5,697,544
[45] Date of Patent: Dec. 16, 1997

[54] ADJUSTABLE PIN FOR FRICTION STIR WELDING TOOL

[75] Inventor: Donald H. Wykes, Cerritos, Calif.

[73] Assignee: Boeing North American, Inc., Seal Beach, Calif.

[21] Appl. No.: 620,060

[22] Filed: Mar. 21, 1996

[51] Int. Cl.$^6$ ................................................ B23K 20/12
[52] U.S. Cl. ............................ 228/2.1; 228/25; 156/580
[58] Field of Search .......................... 228/112.1, 114.5, 228/2.1, 2.3, 25, 45; 156/580, 73.5; 279/141

[56] References Cited

U.S. PATENT DOCUMENTS

| | | | |
|---|---|---|---|
| 4,122,990 | 10/1978 | Tasaki et al. | 228/2.3 |
| 5,056,971 | 10/1991 | Sartori | 409/201 |

FOREIGN PATENT DOCUMENTS

| | | | |
|---|---|---|---|
| 001393567 | 5/1988 | U.S.S.R. | 228/2.3 |
| 001712107 | 2/1992 | U.S.S.R. | 228/2.3 |

OTHER PUBLICATIONS

Industrie–Anzeiger, "Das Verbinden von CrNi–Stahl mit Aluminium und AL–Legierungen nach dem Reibschweissverfahren" May 26, 1970.

The Welding Institute, "Joining Aluminium to Steel–A Review . . . Friction Welding" Jun. 1979.

*Primary Examiner*—Samuel M. Heinrich
*Attorney, Agent, or Firm*—Harry B. Field; Steven E. Kahm

[57] ABSTRACT

A stir friction welding tool with a variable length pin relative to the shank of the tool is disclosed. The pin is moveable from a totally retracted position relative to the shank such that the shank may engage a workpiece without the pin engaging the workpiece. The pin then may be slowly extended into the work piece. The stir friction welding tool may also have a variable diameter shank to provide a variable volume cavity. Then as the pin is extended further into the workpiece the variable width shank can expand to increase the circumference of the shoulder and the volume of the cavity in the shank such that the pin length to cavity volume are within a range to insure a good surface material flow and a high weld quality using the stir friction welding process.

7 Claims, 4 Drawing Sheets

ADJUSTABLE PIN FOR FRICTION STIR WELDING TOOL

BACKGROUND OF THE INVENTION

1. Field of the Invention

This invention relates to friction stir welding tools and more particularly to a tool for with an adjustable pin length.

2. Description of the Related Art

The Welding Institute in Cambridge, England has developed a new method of joining materials by fiction stir welding (see U.S. Pat. No. 5,460,317). This method employs a tool having a pin which is plunged into and stirs to a plastic state the material to be joined. The pin preferably has threads for forcing the plasticized material downward and backward (see British patent application number 9405491.3 filed Mar. 21, 1994). When the pin is moved along the faying surface the plasticized material flows from the front of the pin to the rear as the pin traverses the faying surface. A shank at the top of the pin keeps plasticized material from leaving the joint region.

The pin length in the prior art has been fixed. The pin depth must be controlled to a very close tolerance to ensure a complete weld with the pin tip being within 0.002 inches from the bottom of the faying surface. Only a constant thickness plate can be welded by a fixed pin type tool. If the plate thickness varies over it's length or if there is a second plate to be welded with a different thickness the fixed pin depth tool could not be used. If a different thickness plate is desired to be welded a tool change would have to be made even for a small difference in plate thickness.

SUMMARY OF THE INVENTION

This invention relates to a friction stir welding tool having an accurately adjustable pin length relative to the shank of the tool. The pin is extendible relative to the shank. The shank of the tool has an adjustable diameter to accommodate different pin lengths since the pin size to shank size ratio is important in friction stir welding. The shank diameter is changed by having concentric shank portions which move on the friction stir welding tool shaft. The adjustable friction stir welding tool is capable of welding workpieces which have variable depths or different depth workpieces without changing tools. Adjustable friction stir welding tools are also useful in repairing welds when various depth repairs need to be made. Adjustable friction stir welding tools are also useful fox making continuous welds where the pin is ramped into and out of the workpiece without leaving holes.

OBJECTS OF THE INVENTION

It is an object of the invention to provide a tool for friction stir welding with an adjustable pin extension.

It is also an object of the invention to accurately control the pin extension while welding.

It is a further object of the invention to weld variable thickness plates.

It is still a further object of the invention to weld plates having different thicknesses without having to change tools.

It is another object of the invention to eliminate the holes in the work left by traditional friction stir welding tools.

It is yet another object of the invention to have a variable diameter shank on the friction stir welding tool.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
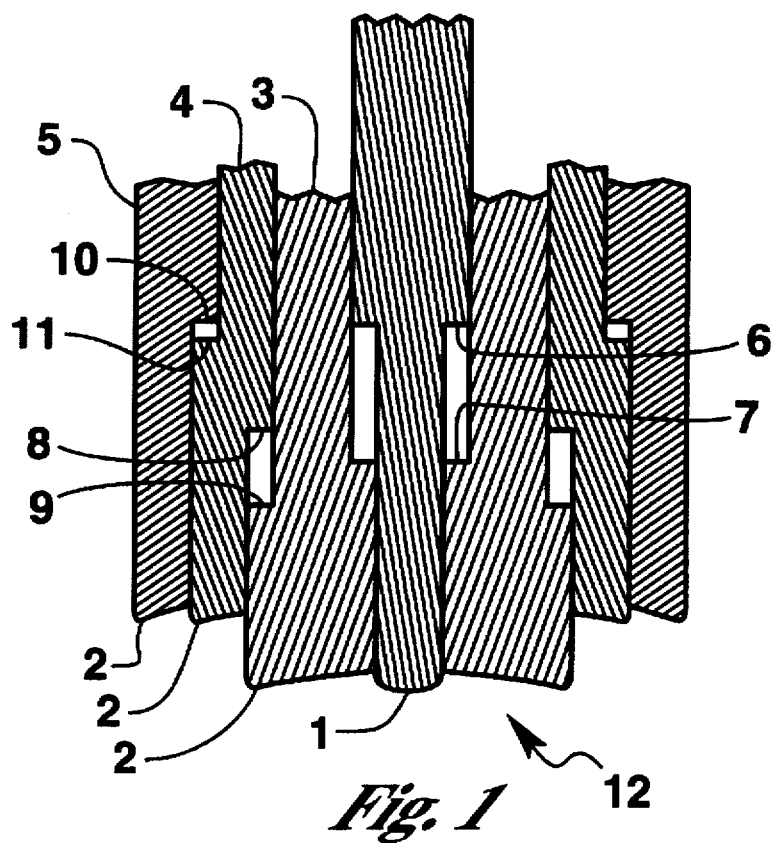
FIG. 1 is a center cut-a-way side view of the adjustable length stir friction welding tool with the pin and shanks retracted.

FIG. 1 shows an adjustable stir friction welding pin 1, surrounded by three shank portions, and inner shank portion 3 is fixed, a middle shank portion 4, and an outer shank portion 5 are adjustable. The number of shank portions can vary in number from one to as many as is practical for the use of the stir friction welding desired. In this embodiment three shank portions are shown. In FIGS. 3–7 two shank portions are shown, one being adjustable. In FIG. 1 the pin and shank portions are shown retracted. The shanks have shoulders 2, for engaging the workpiece and ensuring that the plasticized material in the cavity 12, does not escape. The ridges 6, 7, 8, 9, 10 and 11, on pin 1, inner shank 3, middle shank 4, and outer shank 5, are for stopping the pin and shanks when they are fully extended. These ridges are the ridge in the pin shank 6, which abuts the ridge on the inner shank 7, when the pin is fully extended. The inner shank 3, has a ridge 9, which limits the extension of middle shank portion 4, by engaging ridge 8, portion, and the middle shank portion 4, has ridge 11, which stops the outer shank portion 5, at ridge 10.

As the pin enters a workpiece the inner shank 3 has already engaged the workpiece. The pin depth to shank cavity volume ratio is important for accumulating plasticized material and returning it to the portion of the hole made by the pin as it travels the faying surface of the weld, (see U.S. Pat. No. 5,460,317 and British patent application number 9405491.3 filed Mar. 21, 1994 for details. These references are made a part hereof and incorporated herein by reference. Further, see copending U.S. application Ser. No. 08/619,364 file number 96ST003 filed on even date herewith which is hereby made a part hereof and incorporated herein by reference for other means of adjustable friction stir welding and methods of welding using adjustable friction stir welding pins.

Figure 2:
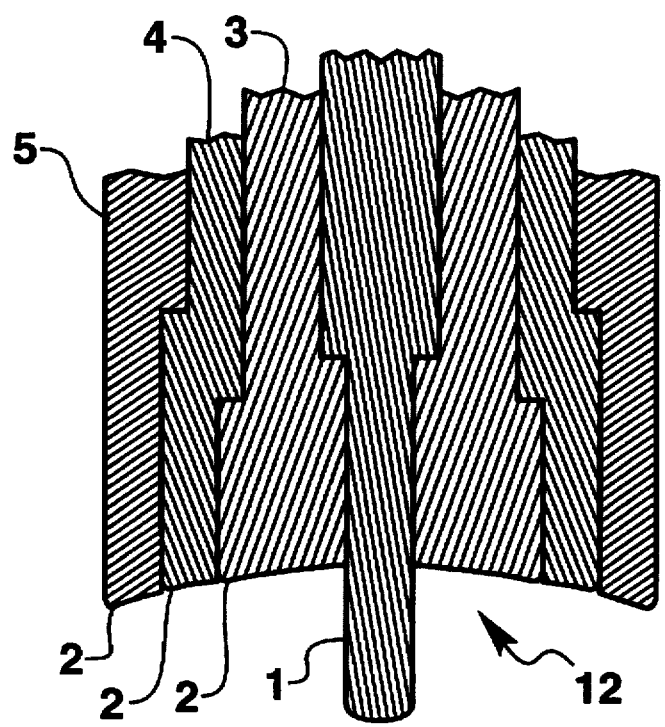
FIG. 2 is a center cut-a-way side view of the adjustable length stir friction welding tool with the pin and shanks extended.

As the pin 1, extends into the workpiece eventually the shank area to pin depth ratio necessitates that the shank be extend and the volume of cavity 12 be increased. For this to occur, the middle shank portion 4 can be extended such that it engages the workpiece 40. Similarly the outer shank portion 5 is extended to engage the workpiece 40 as pin 1 approaches full extension. Cavity 12 is now enlarged to its full extent as well. FIG. 2 shows the adjustable pin stir friction welding tool fully extended.

The differing diameter shanks allow for a larger range of thicknesses over which the variable length stir friction welding pin tool can be used by providing a larger surface flow control cavity 12, as the pin is extended and displaces an increasing amount of weld material.

The differing diameter shanks 3, 4, 5 provide a cleaner weld path on the top of the workpiece 40, by providing greater control over the surface weld material flow which helps minimize cleanup machining after the weld.

Figure 3:
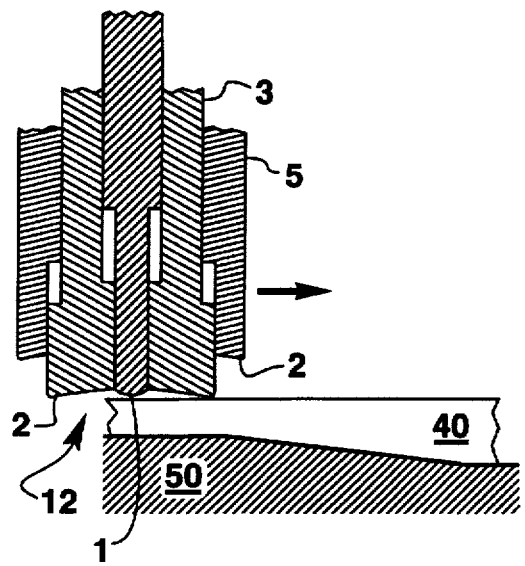
FIGS. 3–6 are center cut-a-way side views of the adjustable length stir friction welding tool as the pin and shank extend in a variable depth workpiece.
Figure 4:
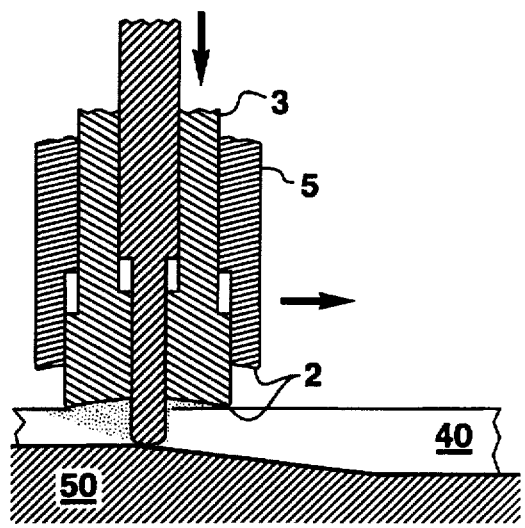
Figure 5:
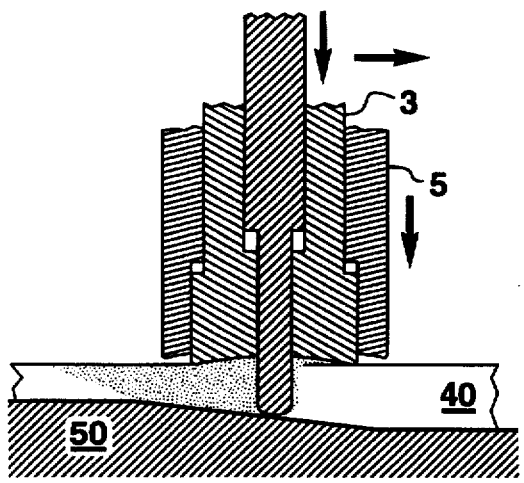
Figure 6:
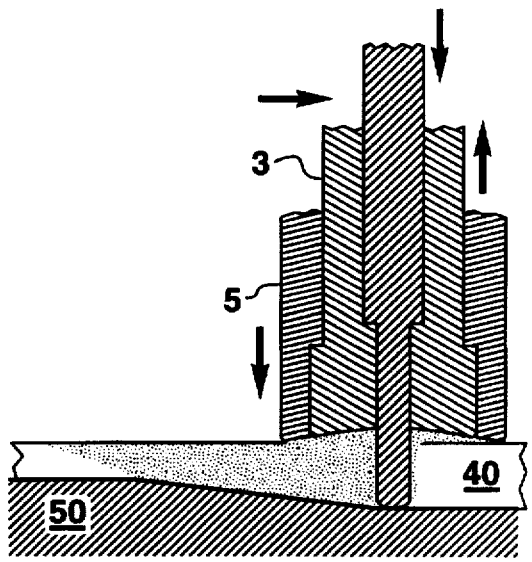

FIGS. 3-6 show the pin 1, and shanks 3, and 5, being extended into a workpiece 40, which has a variable thickness. The pin 1 in FIG. 3, is shown fully retracted with the shoulder 2 of the inner shank portion 3 engaging the workpiece 40. The pin is then shown in FIG. 4 fully extended for the narrow depth portion of the workpiece 40 inner shank 3, still engaging the workpiece 40. At thicker portions of the workpiece 40 the pin 1 must extend further into the workpiece 40 and the pin 1 to shank cavity 12, ratio must change. Therefore outer shank 5 is extended, increasing the cavity size of the shank. As shown in FIG. 6, the inner shank 3 is lifted in a coordinated manner as the outer shank 5, and pin 1 are extended.

The adjustable pin length stir friction welding tool is herein shown only with a tapered variable thickness workpiece, however the adjustable pin length stir friction welding tool may also be used in various configurations on other workpieces. Further, it is possible to use a variable pin length tool on many workpieces of varying constant thicknesses without having to change tools. It is important for complete weld to have the pin depth to within a few thousands of an inch of the bottom of the workpiece 40. Since an adjustable tool can do the work of many fixed tools it is desirable to have an adjustable length tool.

Figure 7:
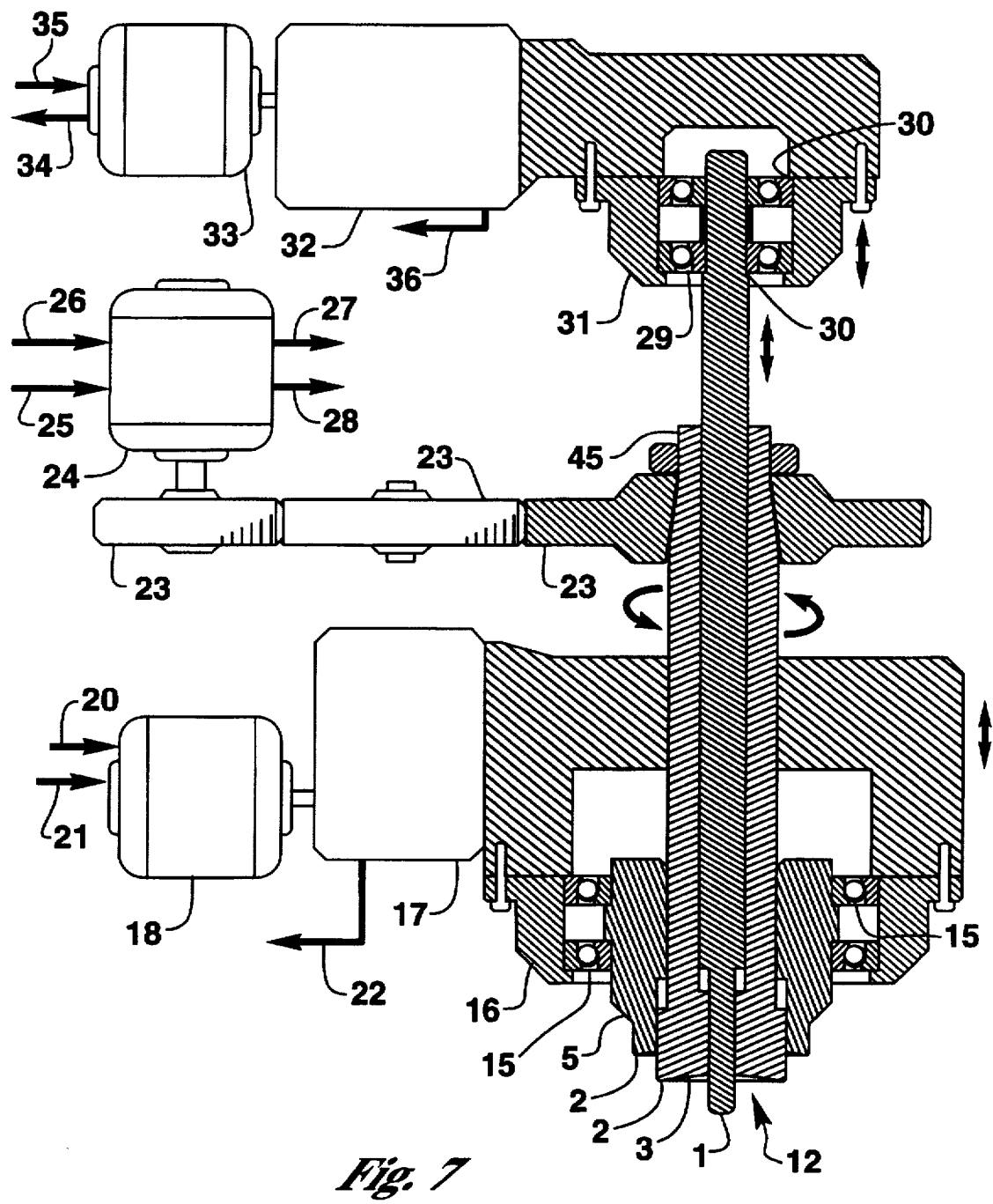
FIG. 7 is a center cut-a-way side view of the adjustable length stir friction welding tool with the drive mechanism shown.

FIG. 7 shows a mechanical means of moving the pin and the shanks to various positions as desired. A mechanical means is not the only means of moving the pin and the shanks. Hydraulic means are disclosed in copending application Ser. No. 08/619,364 applicants file number 96ST003. Other means such as pneumatic or electromechanical means may also be used to move the pin 1 and shanks 3, 4, 5.

FIG. 7 is a two-shank embodiment, wherein fixed inner shank 3, and adjustable outer shank 5, are shown.

The shank extension means presented is by a shank positioning arm 16 on shank 5. Bearings 15 are used to engage the spinning shank portion 5 connected to the fixed shank positioning arm 16. The shank positioning arm 16 is connected by gears in gear box 17 to a motor 18 for positioning the shank 5. Embodied within gear box 17 is a position sensor having position sensor output 22. The motor has a power source 20, and process control input 21. A general purpose computer programmed to process sensor data and control the pin and shank positions is not shown.

A spindle motor and sensors 24 are used to turn the pin 1 and shanks 3 and 5 which are splined together in this embodiment. However, in other embodiments, it is possible to control the pin and shanks at different turning rates if desired. The motor 24 is connected to a gear drive system 23, which engages the shank portion 45, of the inner shank 3. The motor and sensors 24 have a power input 25. There is a process control input 26, a torque sensor output 28 and a speed sensor output 27 which go to a general purpose computer programmed to run the system. In this embodiment the inner shank 45 is fixed in position relative the pin shank 2 and the outer shank 5.

The pin 1 movement is controlled by pin shank 2 connected to pin adjusting ridges 30 on either side of pin depth adjuster arms 31 which are connected by gear box 32, having position sensor output 36, leading to positioning motor and sensors 33. The fixed pin depth adjuster arms use bearings 29 to contact the rotating pin adjuster ridges 30.

The positioning motor and sensors 33 have a power input 34 and a process control input 35. The process control input 35 and position sensor output 36 are connected to a general purpose computer (not shown) programmed to control the adjustable pin stir friction welding tool.

Figure 8:
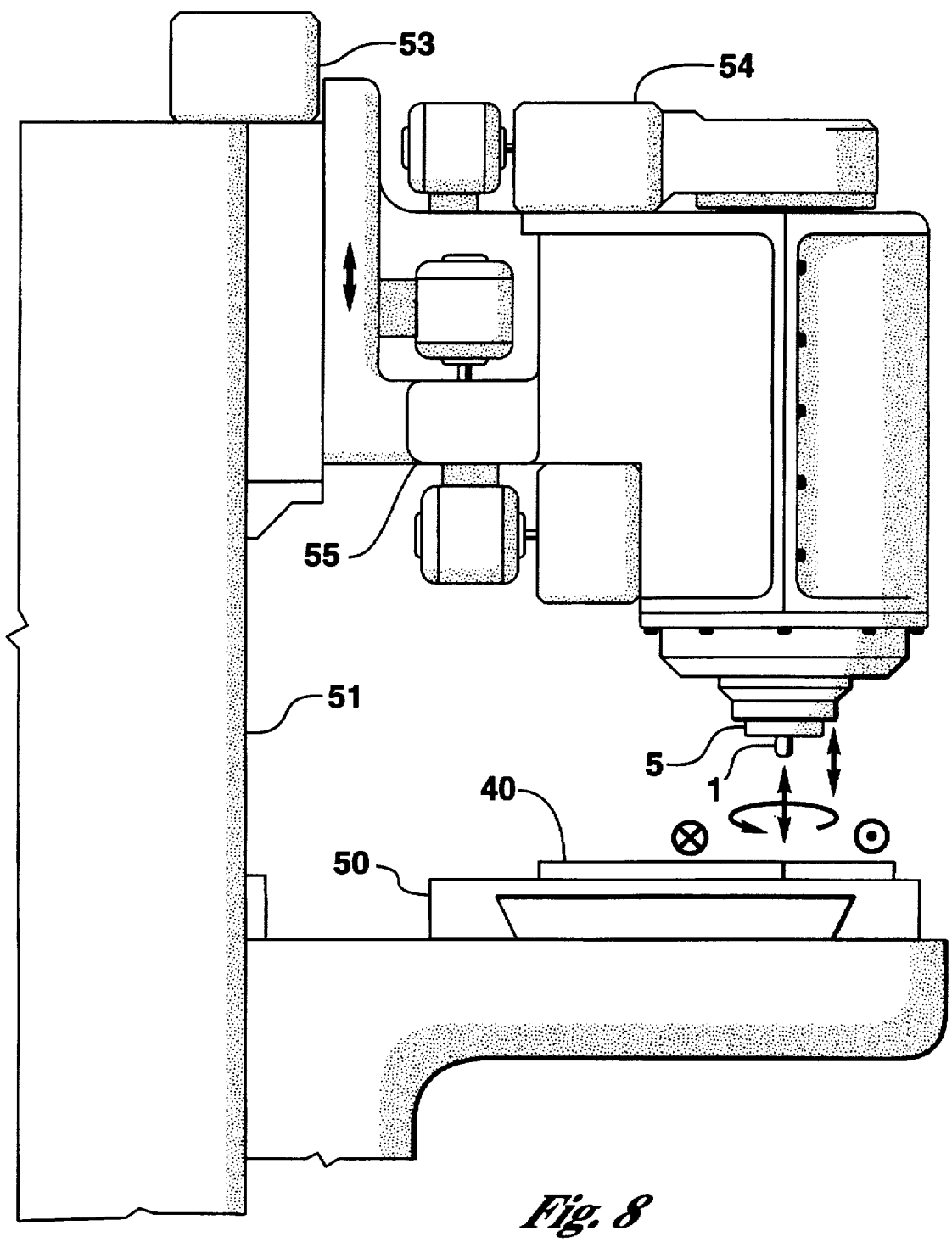
FIG. 8 is a side view of a machine tool with the adjustable stir friction welding tool attached.

FIG. 8 shows a portion side view of a machine tool frame 51, and tool bed 50, in relation to the vertical position and drive system 53, the rotating drive motor and sensor system 54, and the adjustable outer shank member system 55 for positioning the pin 1 and outer shank 5 for welding workpiece 40.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An adjustable pin stir friction welding tool comprising:

a shank portion, and a pin portion wherein the pin portion is adjustable relative to the shank portion for extending and retracting the pin portion into a workpiece.

2. An adjustable pin stir friction welding tool as in claim 1 wherein, the shank portion has a plurality of adjustable sections each extendible to engage the workpiece.

3. An adjustable pin stir friction welding tool as in claim 2 wherein, the adjustable sections of the shank portion have different shank diameters to change the area of the shank engaging the workpiece.

4. An adjustable pin stir friction welding tool as in claim 2 wherein, the adjustable sections of the shank portion have a different cavity diameter to change the volume of the cavity of the shank engaging the workpiece.

5. An adjustable pin stir friction welding tool as in claim 1 wherein, a means to move the adjustable pin is employed.

6. An adjustable pin stir friction welding tool as in claim 2 wherein, a means to move the adjustable pin is employed.

7. An adjustable pin stir friction welding tool as in claim 6 wherein, a means to move the adjustable shank is employed.

* * * * *